United States Patent [19]
Lohoff

[11] 3,916,678
[45] Nov. 4, 1975

[54] SOIL MOISTURE DETECTION DEVICE

[76] Inventor: Warren G. Lohoff, 1947 Havenwood Drive, Thousand Oaks, Calif. 91360

[22] Filed: Jan. 21, 1974

[21] Appl. No.: 434,865

[52] U.S. Cl. ............................................. 73/73
[51] Int. Cl.² .................................... G01N 33/18
[58] Field of Search ............ 73/73; 239/63; 47/38.1; 116/114 R

[56] References Cited
UNITED STATES PATENTS
3,438,575  4/1969  Rohling ............................ 239/63

Primary Examiner—James J. Gill
Assistant Examiner—Anthony V. Ciarlante
Attorney, Agent, or Firm—Roger A. Marrs

[57] ABSTRACT

An automatic soil moisture detection apparatus responsive to a shortage or need for water in the soil is disclosed. The apparatus includes a porous sensing element that is inserted into the soil and responds to the moisture content of the soil to control a visual indicator of the soil condition. The porous element constitutes an air valve. When the soil is relatively dry, air flows through the porous element to break a small vaccuum which activates the indicator. When the soil is wet, air cannot pass through the sensing element and the indicator is not activated.

6 Claims, 11 Drawing Figures

U.S. Patent  Nov. 4, 1975  Sheet 1 of 2  3,916,678
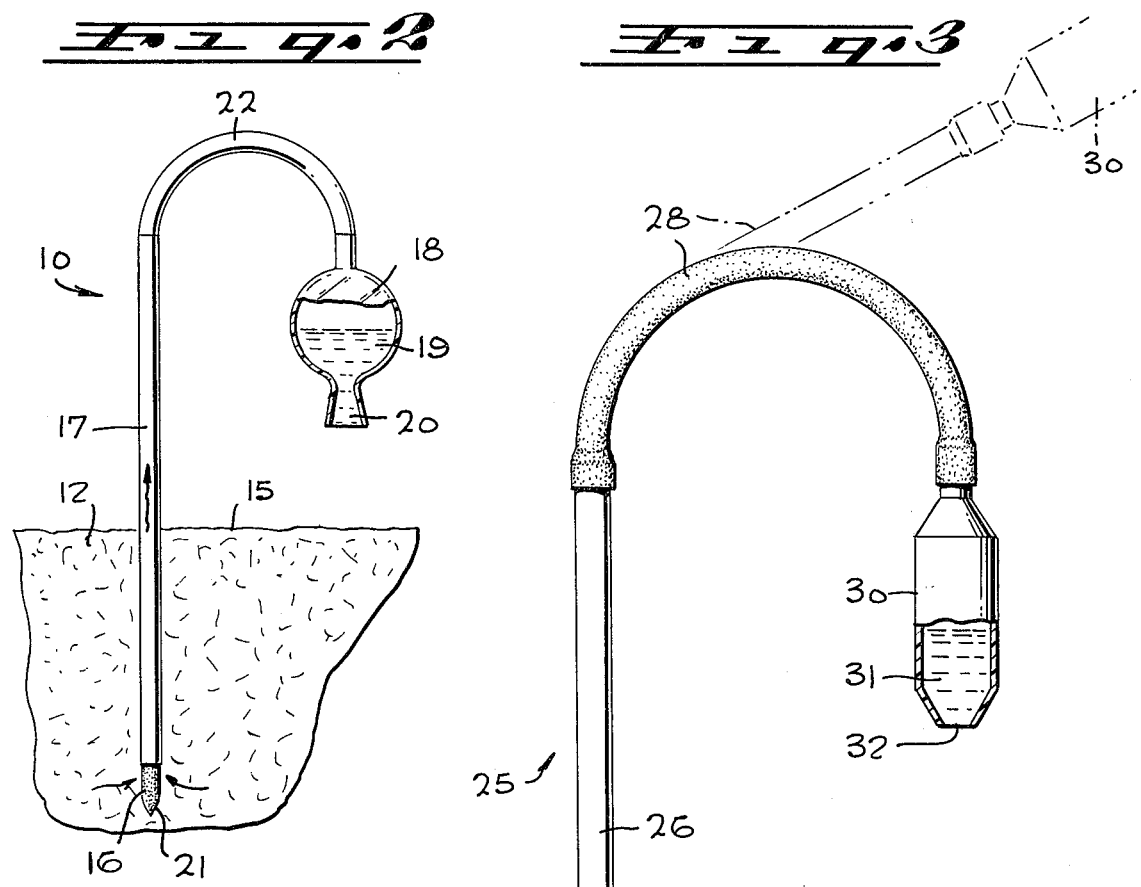
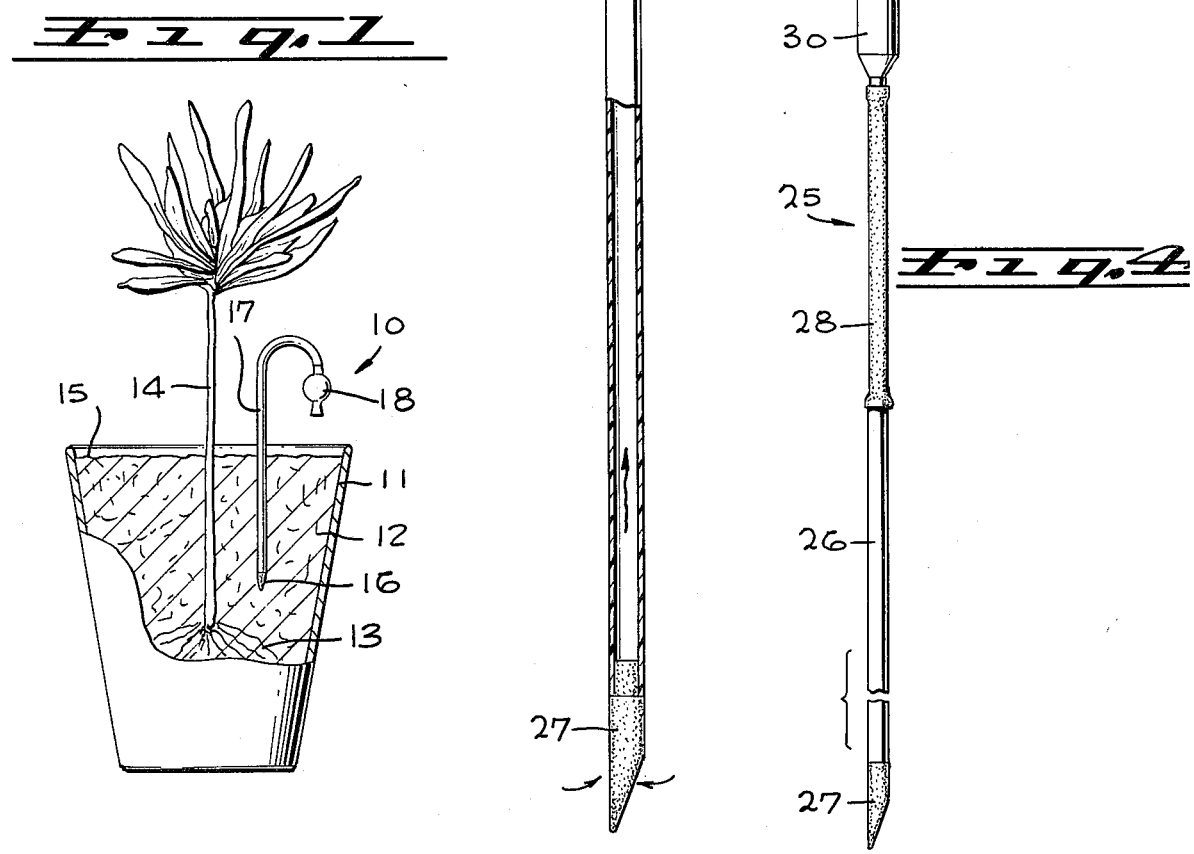

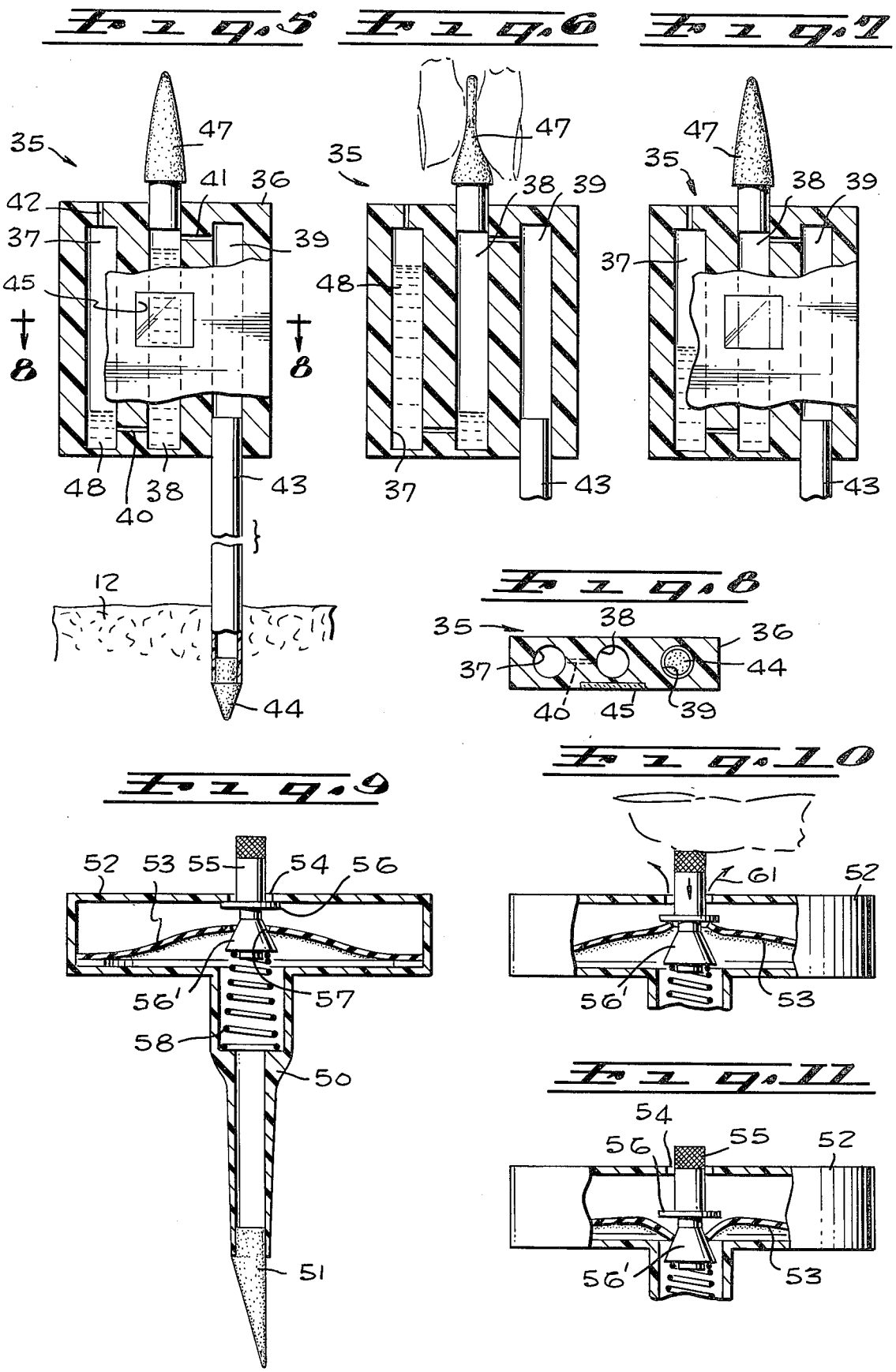

SOIL MOISTURE DETECTION DEVICE

BACKGROUND OF THE INVENTION

1. Field of the Invention

The present invention relates to the watering of plants and the detection of soil moisture and more specifically to a novel detection device that senses the mositure content of the planting medium, i.e., soil and that a visual indication of the moisture condition of the soil.

2. Description of the Prior Art

It is well known that in order for plants to flourish they must be provided with the proper amount of moisture. By providing a plant with too little or too much water, its growth processes or life span will be impeded. Since the proper amount of moisture varies not only amoung different types of plants, but with the particular environment in which the plant is growing, it is a time consuming process to manually supply the necessary water. Automatic devices for providing the necessary water to the plant are highly desirable and time saving devices.

However, the variability and unpredictability of the amount of water needed by a specific plant is difficult to forecast. Water should be provided to the plant in response to the plant's need for the water and not, as is characteristic of prior art devices, in response to an arbitrary standard, such as time. Time responsive watering devices have been generally found unsatisfactory since a plant's need for water is not solely a function of time, but varies with condition of the planting medium, the atmospheric temperature, humidity, etc.

Therefore, a longstanding need has existed to provide a soil moisture sensor responsive to the moisture content of the soil in which the plant is growing and which is a direct indication of the plant's suficiency or need for water.

SUMMARY OF THE INVENTION

Accordingly, the problems and difficulties encountered with prior art watering or moisture devices are obviated by the present invention which provides a vaccuum sensing system sensitive to the moisture content of the soil for actuating a visual indicator displaying a need for adding water to the soil or moisture sufficiency.

In one form of the invention a vaccuum means is provided which includes an air valve embedded in the soil and a vaccuum producing device operable with the valve to activate the indicator. The valve is a porous sensing device that functions as an air valve and responds to the moisture condition of the soil. The air valve sensor is attached to one end of a tube while an indicator having a small charge of water is attached to the opposite end. The charge of water draws a slight vaccuum in the tube which maintains the charge in a fixed position. The indicator provides visual means for observing the water charge. Upon response of the sensor valve to a dry soil condition, the vaccuum breaks to release the charge of water. A visual observation is noted of the change of water charge position.

Therefore, it is among the primary objects of the present invention to provide a novel soil moisture detector having a positive means for sensing soil moisture condition and for indicating the condition.

Another object of the present invention is to provide a novel means for testing and displaying soil moisture conditions.

Another object of the present invention resides in providing an inexpensive and maintainance free water detection device for planters and the like.

A further object of the present invention resides in a novel soil moisture detection device having a visual display for observing the mositure condition of soil carried in a planter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a cross-sectional view of a typical planter employing the soil moisture detector of the present invention;

FIG. 2 is an enlarged side elevational view, partly in section, of the soil moisture detector illustrating a release of the water charge for indicating a dry soil condition;

FIGS. 3 & 4 are side elevational views of another embodiment of the present invention;

FIG. 5 is a side elevational view of another version of the present invention illustrating the device in position for sampling the condition of the soil;

FIG. 6 is a view similar to the view of FIG. 5 illustrating the initial setting of the water charge;

FIG. 7 is a view similar to the view of FIG. 5 illustrating a displacement of the water charge from its position in FIG. 5 responsive to a dry soil condition;

FIG. 8 is a transverse cross sectional view of the detector shown in FIG. 5 as taken in the direction of arrows 8—8 thereof;

FIG. 9 is a longitudinal cross sectional view of still another version of the present invention for sensing soil moisture conditions; and FIGS. 10 and 11 are fragmentary views illustrating the setting and vaccuum conditions of the device respectively.

DESCRIPTION OF PREFERRED EMBODIMENT

Referring to FIG. 1, one embodiment of the present invention is shown in the general direction of arrow 10 which is illustrated as being mounted in a typical potted plant. The potted plant includes a planter receptacle or pot 11 having a continuous sidewall for holding a quantity of soil indicated by numeral 12. The soil bed 12 contains a root system 13 for a plant 14 and the pot 11 includes a central opening for introducing soil into the pot and for permitting the plant 14 to grow upwardly beyond the sidewall of the pot. Water and other plant nutrients may be introduced to the soil 12 via the exposed top surface portion 15 of the soil bed.

It is to be noted that the lower portion of the moisture sensing device 10 is embedded within the soil 12 and that a portion thereof projects through the top surface 15 of the soil where it is available for visible observation.

In general, the soil moisture detector or sensor 10 includes a porous sensing element 16 carried on one end of a rigid duct or tube 17 including a partially air evacuated chamber within the tube that terminates in a hollow bulb 18 having an orifice 20. The porous sensing element 16 is provided for controllably admitting air into the partially evacuated air chamber in the tube 17 whenever the condition of the plant soil 12 reflects a need for more moisture. The material of the bulb 18 is transparent and is employed for enclosing a charge of water indicated by numeral 19 in FIG. 2. When the vaccuum within the chamber portion of tube 17 is maintained, a level of water is noted in the bulb 18. However, when the vaccuum is broken, the water within bulb 18 will be released through the orifice 20.

Referring now in greater detail to FIG. 2, an enlarged version of the embodiment 10 is illustrated in a typical application. The sensing element 16 may be formed of a porous ceramic material, may have a generally cylindrical configuration on the order of three-eighth of an inch in diameter and 2 inches in length. If desired, although not a requirement, the free end of the sensing element is pointed or beveled, as at numeral 21, so that the sensing element may be readily inserted into and completely buried by the planting soil 12. In a relation as described, the material of the sensing element 16 is preferrably a ceramic material having an average pore size on the order of about 5 to about 12 microns. The arrangement is such that when the porous ceramic sensing element is in a relatively dry condition, it will permit the controlled seepage of air into the air tube 17 and thereby into the partially evacuated chamber 22 within the tube 17. However, when the sensing element is contacted by substantial moisture, the moisture is drawn into the sensing element by capillary action and functions, at least within the parameters of the present invention, to close off the pores of the element to the further flow of air and thereby prevent the further seepage of air into the air tube 17. For "arid" plant conditions, pore sizes toward the small end of the range are desirable, and for "wet" conditions, pore sizes toward the larger end of the range are more suitable.

Typically, the discharge nozzle 20 of the bulb 18 carried on the end of air tube 17 is disposed near the top surface 15 of the soil bed. However, the sensing element 16 is disposed substantially below the orifice when embedded in the soil 12. The porous ceramic air valve 16 allows air to flow through the tube 17 when the soil is dry and releases the water captured within the bulb 18 by breaking the partial vaccuum in the tube chamber 22.

In the actual operation of the embodiment 10, the charge of water 19 is initially introduced into the chamber of the bulb 18 through the opening or orifice 20. Obviously, the device is removed from the soil and is held upside-down so that the water may be introduced to the bulb. However, when the device is turned right-side-up and the valve 16 is inserted into the soil 12, the charge of water 19 tends to discharge through the orifice 20. In so doing, a vaccuum is drawn in the tube 17 and extends partially within chamber 22 of the device. This vaccuum will hold the charge of water 19 in the bulb 18 and the water will not discharge through the opening 20. The vaccuum will be maintained in the chamber until such time as the air valve 16 sufficiently dries out permitting air to be introduced into tube 17 as shown in the direction of arrows in FIG. 2. The introduction of air into the tube will break the vaccuum in chamber 22 and discharge the water 19 from bulb 18.

For convenience, a portion of the tube 17 which is connected to the bulb 18 may be flexible rather than rigid so that the bulb may be turned upside-down for introduction of a new charge of water to the bulb without neccessitating the removal of the tube from the soil. By visual inspection, the user of the device may now observe if the charge of water 19 is still within the chamber of bulb 18 or if the charge of water has been released. If the water is still in the bulb, then the moisture of soil 12 is sufficient for plant life. However, if the water has been released from the bulb, then it is time to add more water to the soil 12.

Referring now in detail to FIGS. 3 and 4, another embodiment of the present invention is illustrated which is indicated in the general direction of arrow 25. In a manner similar to that described with respect to the embodiment 10, device 25 includes a rigid tube 26 having an air valve 27 fastened on one end of the tube. Valve 27 is of ceramic material as previously noted and is buried within the soil 12 of the potted plant. The opposite end of tube 26 is secured to a flexible hose 28 which carries a bulb 30 on its free end. A charge of water 31 is introduced to bulb 30 via opening 32 when the tube 28 is flexed so that water may be poured through the opening 32 into the bulb. The water will progress through tube 28 for a certain distance. When a small charge has been introduced into the bulb, tube 28 is permitted to topple downwardly into the position shown in solid lines in FIG. 3 so that the charge of water will draw a small vaccuum in tube 28 and in a portion of the chamber within the bulb 30. The bulb 30 will hang as shown in solid lines due to the weight of the charge of water 31 so that a visual indication is presented displaying a condition of adequate moisture in the soil 12. However, when the soil has sufficiently dried, air is permitted to travel within tube 26 as shown in the direction of the arrow adjacent air valve 27 so that the vaccuum is broken and the water 31 is released through opening 32. The spring bias of the flexible tube 28 is sufficient to swing the bulb 30 upwardly as shown in the intermediate position in broken lines. As the bulb travels further, it will have a tendency to stand straight up as indicated in FIG. 4 so that a visual display is created indicating a dry soil condition. Once the soil has been rejuvenated with water, an additional water charge may be placed into the bulb 30 so that the bulb will again be set in the position shown in solid lines in FIG. 3 indicating sufficient moisture in the soil 12.

The embodiment 25 shown in FIGS. 3 and 4 may be referred to as a swinging version of the invention. First, the bulb is filled with water then the weight of the bulb topples over to draw a portion of the water back into the upper tube 28 which draws a vaccuum. The vaccuum is maintained as long as the air valve 27 is moist. If the air valve is not moist, then air is admitted to break the vaccuum and dump or release the water from the bulb so that the bulb will spring back to the position shown in FIG. 4 due to the bias of the flexible hose material.

Referring now to FIGS. 5–8 inclusive, another version of the present invention is illustrated and is indicated in the general direction of arrow 35. Soil moisture detector 35 includes a body or housing 36 having three parallel compartments 37, 38 and 39. It is to be noted that chambers 37 and 38 are incommication via a passageway 40 while chambers 38 and 39 are communicated by means of passageway 41. Compartment 37 is vented to atmosphere via opening 42 while compartment 39 is in fluid communication with elongated tube 43. The opposite end of tube 43 includes a ceramic sensor 44 which functions as previously described with respect to the other embodiments. For display and indicating purposes, housing 36 includes a window 45 so that a portion of a central compartment 38 is exposed therethrough for visual observation. When a water level is displayed through the window in compartment 38 as shown in FIG. 5, an observation is made that the soil 12 has sufficient moisture. On the other hand, if the presence of a water level is not shown through the window 45 in compartment 38, an observation is made that the soil requires the addition of moisture thereto. The indication of a no water level is shown in FIG. 7.

In actual operation, an initial vaccuum is established by squezzing a flexible bulb 47 as shown in FIG. 6 which is in communication with the central compartment 38. By squezzing the bulb 47, air is forced out of the bulb and moves a charge of water in compartment 38 into compartment 37. Inasmuch as this compartment is vented via opening 42, the charge of water as indicated in general by numeral 48 will substantially occupy the chanber as shown in FIG. 6. The air will also bubble through the water and vent out the end of the tube via the opening 42. Once the bulb 47 has been released, a vaccuum is created on the probe 43 side within chamber 39 and the charge of water is pulled into position substantially as shown in FIG. 5. As long as the air valve 44 is wet, a vaccuum is maintained. If the air valve is dry, representing a dry soil condition, air enters tube 43 and breaks the vaccuum so that the water 48 shifts position to that shown in compartments 37 and 38 in FIG. 7. Consequently, water in compartment 38 will not be visual through the window 45.

It is comtemplated by the presented invention employing the embodiment shown in FIGS. 5–8 inclusive that a colored fluid may be employed for displaying detections of various soil conditions. Also, visual display may employ a float on the surface 46 which is either displayed or not displayed so as to indicate soil moisture condition.

Referring now to FIGS. 9–11 inclusive, another embodiment of the present invention is illustrated which includes a probe-type body 50 which having a ceramic air valve 51 carried on one end thereof as previously described. The opposite end of the probe 50 includes a circular housing 52 which encloses a diaphragm 53 having its circular periphery fixly carried on the interior wall of the housing 52. Housing 52 further includes a central serrated opening 54 through which the stem of a check valve is slidably mounted as indicated by numeral 55. The check valve includes a limit stop 56 which prevents the valve from pushing out through the opening 54. The end of the stem of the check valve within the housing 52 includes a frustro-conical valve stem 56 that situated within a central opening of the diaphragm 53. The check valve 55 is normally biased or urged into the position shown in FIG. 9 by means of an expansion spring 58.

As shown in FIG. 9, the valve 55 is in its upper most position projecting through hole 57 and exposing a greater portion of the valve stem than is shown in FIG. 11. When the valve stem is so projected from housing 53, a dry condition in the soil is indicated. This stems largely from the fact that air is permitted to enter inside the probe 50 which breaks a vaccuum normally holding diaphragm 53 in the position shown in FIG. 11. Once the vaccuum has been broken, the normal bias of spring 58 will urge the stem of the valve 55 outward to project from housing 52.

As shown in FIG. 10, when the finger is used to depress the check valve 55 in the direction shown by arrow 60, the air behind diaphragm 53 will be exhausted in the direction of arrow 61 so that when the valve is released such as shown in FIG. 11, the vaccuum will hold the diaphragm in a lower or retracted position against the bias of spring 58.

Therefore, it can be seen from the foregoing that several embodiments are described which operate in response to wet or dry soil conditions. When the soil is moist, the air valve is wet and prevents air from breaking the vaccuum. However, when the soil is dry air permitted to go through the air valve and break the vaccuum which operates the indicator. By visual inspection, the wet or dry condition of the soil can be determined. Once the condition has been determined and if the soil is dry, the soil may then be moisten in any suitable or conventional fashion and the device may be reset for again monitoring the moisture in the soil.

It is to be understood that although the creation and maintainance of a vaccuum has been described with respect to operation of the various embodiments of the invention, the presence of a pressure differential is all that is required whether a vaccuum is present or not. The release of the pressure differential will release the liquid or water charge.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A soil moisture condition detector comprising:
    a hollow, rigid probe having opposite ends;
    a porous moisture sensing device carried on one end of said probe so as to close the end thereof and placed within and in contact with and near the upper root zone regions of the soil planting medium;
    said sensing device composed of a non-organic, capillary type material having a plurality of pores of predetermined diameter whereby said device acts as an air valve to restrict air movement from said medium through said porous device when the planting medium in contact therewith has reached a predetermined high moisture condition wherein the moisture within said planting medium has closed said pores and to permit the passage of air from said medium through said porous device when the planting medium has reached a predetermined low moisture condition; and
    indication means operably carried on the other end of said probe for displaying an indication of the soil moisture condition in response to the condition of said sensing device;
    a housing carried on the other end of said probe;
    said housing having a central opening coaxially disposed with respect to said probe;

a check valve movably mounted at said other end of said probe;

said check valve comprising a spring and diaghragm, whereby a pressure differential is maintained or released between said sensing device and said indication means in response to said sensing device.

2. The invention as defined in claim 1 wherein said indication means is a visual display.

3. The invention as defined in claim 1 wherein said indication means is operable in response to said pressure differential between said sensing element and said indication means.

4. The invention as defined in claim 1 wherein said sensing device is a porous ceramic material and has a predetermined pore size large enough when relatively dry to permit the flow of air into said probe and small enough to substantially impede the flow of air and water into said probe when relatively moist.

5. A soil moisture detector comprising
an elongated probe;
an air valve carried on one end of said probe adapted to block the passage of air when moist;
a housing carried on the other end of said probe and having a central opening;
a check valve movably carried within said housing and having an indicator stem projecting through said housing opening;
an expansion spring normally biasing said check valve into closure of said housing opening fully extending said indicator stem out of said housing; and
a flexible diaphragm having its peripherial edge fixed to said housing and its center portion adapted to draw a vaccuum for holding said check valve against the bias of said spring whereby only a portion of said indicator stem projects outwardly from said housing.

6. The invention as defined in claim 5 including a limit stop carried on said indicator stem engagable with said housing to close said housing opening in one position and engagable with said diaphragm when a vaccuum is there behind.

* * * * *